Figure 1:
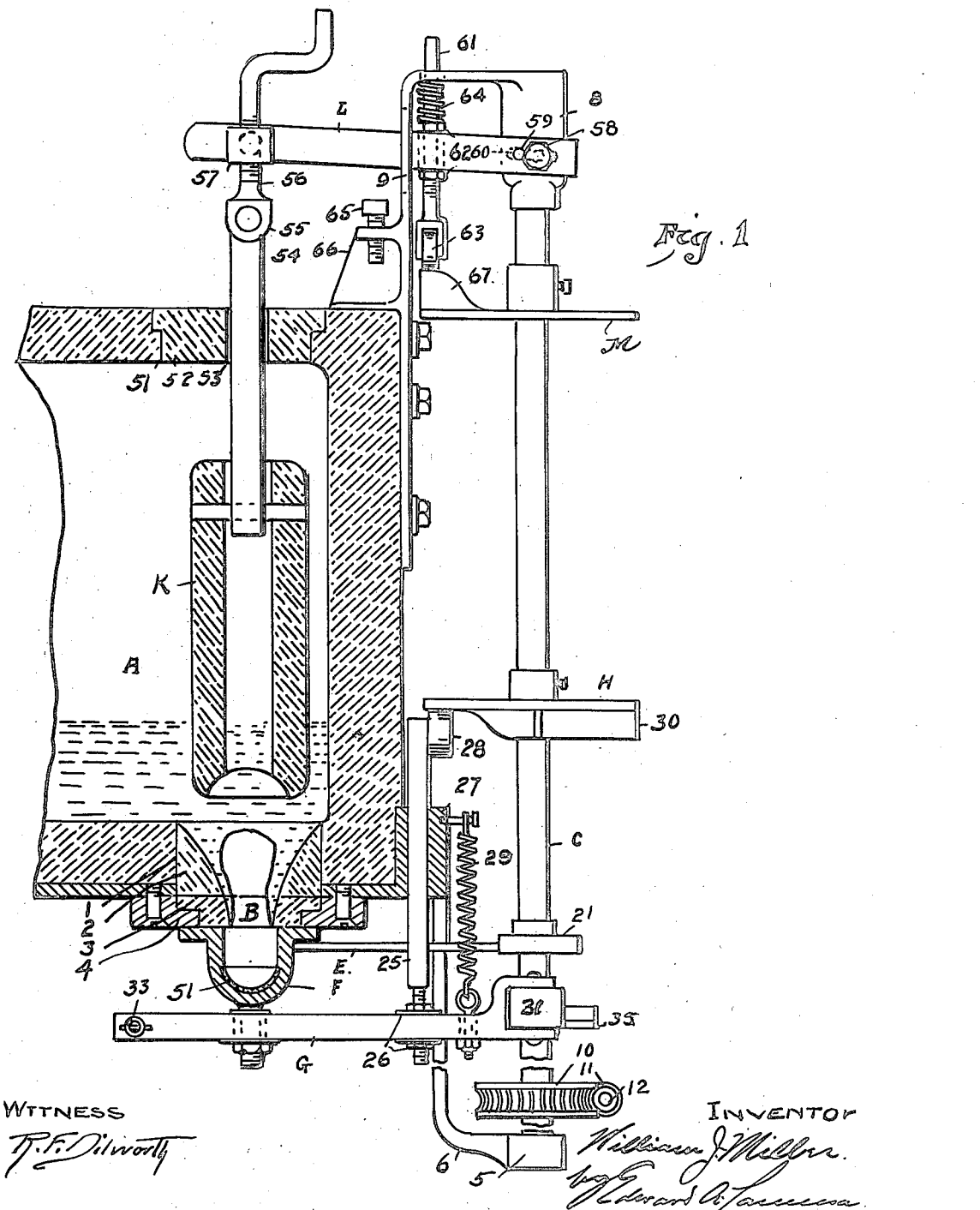

July 24, 1923.

W. J. MILLER

PROCESS AND APPARATUS FOR FEEDING GLASS

Original Filed Jan. 7, 1921  3 Sheets-Sheet 2

1,462,491

WITNESS
R. F. Dilworth

INVENTOR
William J. Miller
by Edward R. Lawrence
his attorney

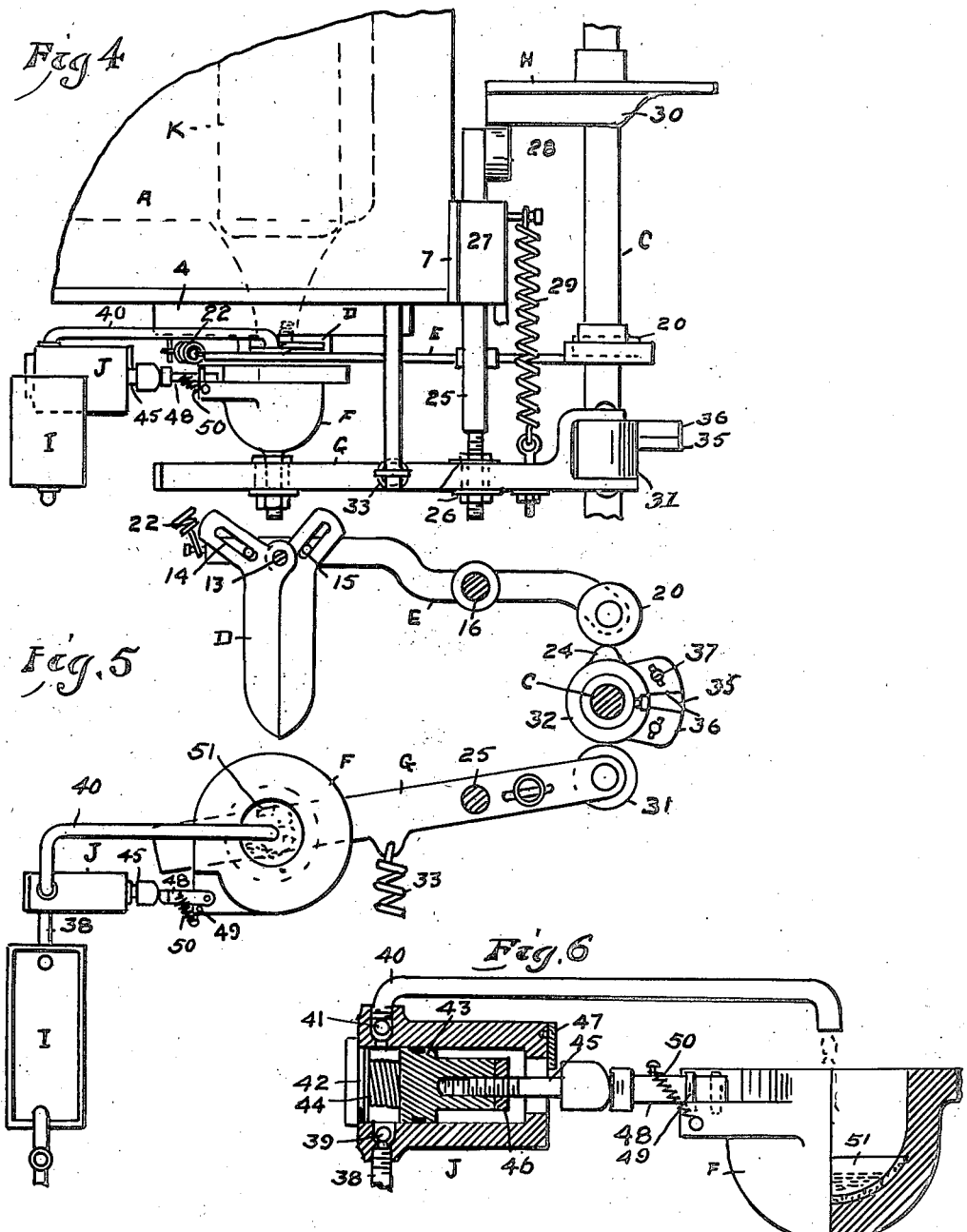

Patented July 24, 1923.

1,462,491

UNITED STATES PATENT OFFICE.

WILLIAM J. MILLER, OF SWISSVALE BOROUGH, PENNSYLVANIA.

PROCESS AND APPARATUS FOR FEEDING GLASS.

Application filed January 7, 1921, Serial No. 435,669. Renewed April 7, 1923.

*To all whom it may concern:*

Be it known that I, WILLIAM J. MILLER, a citizen of the United States, and residing in the borough of Swissvale, in the county of Allegheny and State of Pennsylvania, have invented or discovered the new, useful, and Improved Process and Apparatus for Feeding Glass, of which the following is a specification.

My invention consists in a new and improved process and apparatus for feeding glass.

The object which I have in view is the feeding of molten glass from a tank or other container in proper condition, at proper intervals and in proper quantities, to glass fabricating machines.

Generally speaking, my new and improved process consists in intermittently shearing off, or otherwise causing to be detached the glass protruding from the discharge orifice to form gathers, and, between the intermittent detachings to temporarily interrupt the outward flow of glass and force the neck of glass back along the orifice into the zone of remelting heat, to eliminate the scar or chilled portion, by applying to the outer end of the discharge orifice a quantity of liquid which almost instantaneously becomes gasified, owing to the heat, and thus forces the neck of glass inwardly along said orifice.

For the accomplishment of these purposes, I associate with the discharge orifice of the tank or other container a cup or receptacle to which is supplied a measured quantity of liquid, such as water either by mechanical means or by an attendant, said cup being applied to the outer end of the orifice after a gather of glass is detached, and which liquid is almost instantaneously gasified and causes the neck of glass, left after said detachment, to move inwardly along the discharge orifice for the purposes above mentioned.

In the embodiment of the principles of my invention illustrated in the drawings, I have shown the receptacle distinct from the shearing means also shown, and have provided said receptacle with means for alternately applying the receptacle to the outer end of the orifice and moving the receptacle away from the orifice to provide clearance for the protrusion of the glass and the shearing operation.

In the said embodiment, I have also shown the gather detaching means as coacting shear blades, but it will be understood that any convenient method or means for detaching the protruding glass to form gathers may be substituted.

In the said embodiment I have shown a gravity flow of glass through the discharge orifice, but I may induce the outward flow of glass through the discharge orifice by any other convenient means, either associated with gravity or disassociated from the latter, and, therefore, the discharge orifice is not necessarily in the bottom of the molten glass container.

To properly regulate the movement of the glass through the discharge port I prefer to provide a valve mechanism coacting with the inner end of the discharge port.

I also provide means for regulating the quantity of liquid supplied at the proper intervals to said receptacle, whereby the proper pressure is obtained to produce the desired retraction of the glass under varied requirements.

Other novel features of construction and arrangement of parts will appear from the following description.

Figure 2:
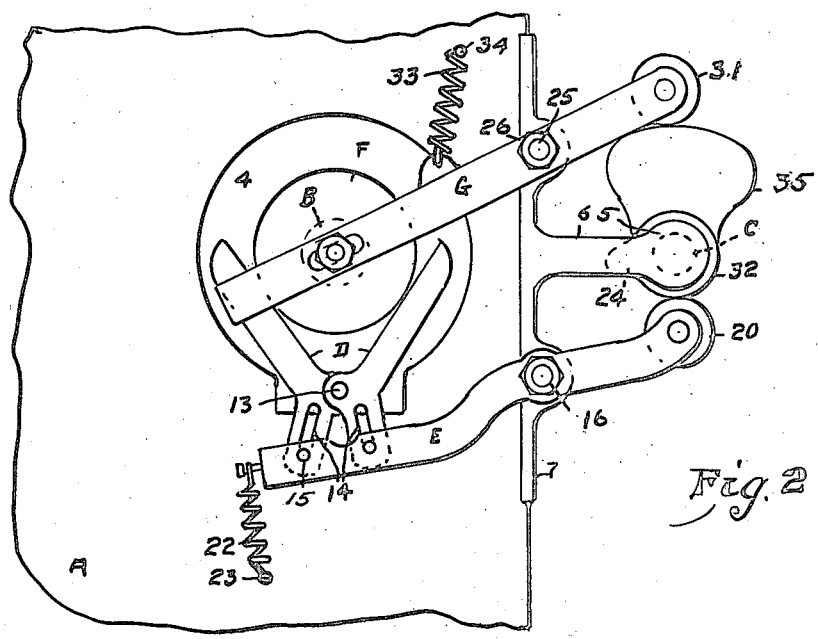
Figure 3:
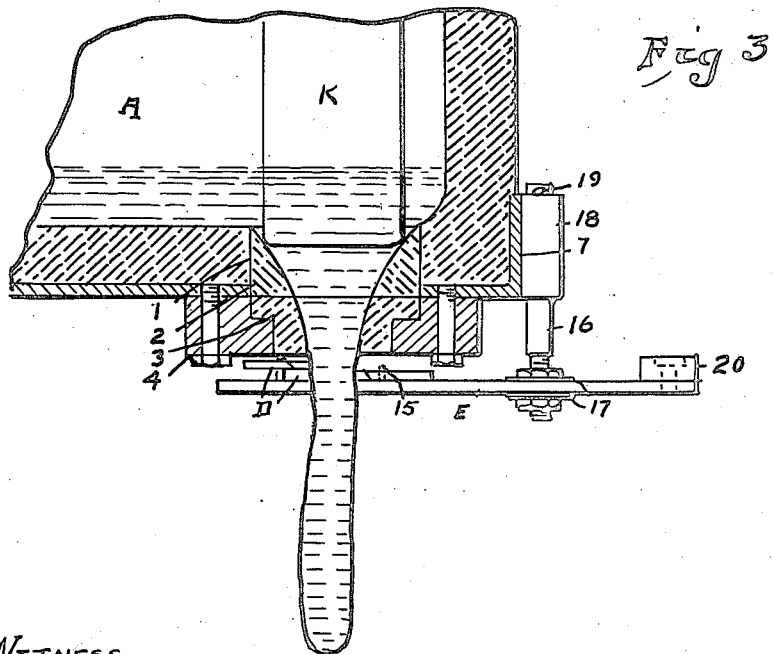

In the accompanying drawings, which are however intended merely to illustrate a practical embodiment of the principles of my invention without limiting the scope of the latter to the construction shown, Fig. 1 is an elevation of a feeder embodying the principles of my invention, the boot of a glass tank being shown in vertical section and the discharge orifice in the bottom of the boot, and the receptacle or liquid containing cup being shown applied to the discharge orifice in which the glass is shown retracted by the gasification of the liquid; Fig. 2 is a bottom plan view of the same; Fig. 3 is a vertical section with the operating shaft omitted, showing the glass protruding to form the gather and a shearing operation about to take place; Fig. 4 is a broken view similar to Fig. 1 but showing the cup moved away from the discharge orifice and the shears closed under the latter to detach the gather; Fig. 5 is a plan view showing the cup and shears in the relative positions shown in Fig. 4, together with their operative mechanism, and Fig. 6 is an enlarged detail in side elevation, partially in section showing the cup and its liquid supply means.

The following is a detailed description of the embodiment of the principles of my invention illustrated in the drawings.

A represents the boot or shallow extension of a glass tank arranged for the gravity feed or discharge of the molten glass.

Thus the bottom of said boot is provided with a circular opening 1 in which is mounted a bushing 2 of refractory material. 3 is a mouth ring also of refractory material and having its perimeter under cut to seat in a recessed metal supporting ring 4 which is detachably secured to bottom of the boot. The bore of the bushing 2 is upwardly enlarged or flared, as shown, to facilitate the entrance of the glass from the boot and also its retraction after a shearing operation, and also to facilitate the seating of the plunger valve in its closed position. The bore of the mouth ring is similarly upwardly flared to register with the lower end of the bore of the bushing, thus forming a continuous port or passage which constitutes the discharge orifice B of the feeder.

The diameter of the lower end of the bore of the mouth ring, and consequently the mouth of the discharge orifice determines the thickness or diameter of the gathers, and I therefore provide a plurality of mouth rings with different size bores, so that the feeder may be adjusted to the thickness or diameter of gathers required.

C is the operating shaft vertically disposed adjacent to the boot. Thus I have shown the lower end of said shaft journaled in a step bearing 5 mounted on a bracket 6 depending from a front plate 7 attached to the boot. The upper end of said shaft may be journaled in a cap bearing block 8 mounted on an angular bracket 9 attached to the boot A. Rotary power is applied to the shaft C, as by the worm wheel 10 on said shaft meshing with a worm 11 on the power-driven shaft 12.

I will now describe the form of the shearing mechanism shown in the drawings.

D represents a pair of coacting shear blades pivotally connected together and to the under side of the boot in any suitable manner, so as to close snug up under the lower end of orifice B. Thus I have shown a pivot bolt 13 depending from the boot. The blades D are provided with slots 14 in which work the studs 15 on the inner end of a lever E which is pivotally mounted to rock in a horizontal plane. Thus I have shown said lever pivoted on the lower, reduced and threaded end of a shaft 16 by means of upper and lower nuts and washers 17, said shaft being mounted in a vertically disposed socket or bearing 18 carried by the front plate 7; a cotter pin 19 extending through a diametric hole in the upper end of the shaft to prevent its descent in the bearing. The outer, and preferably shorter, end of the lever E is provided with a roller 20, journaled on a vertical axis and held in resilient contact with a collar 21 on shaft C, by means of a helical spring 22 connecting the inner end of lever E with a stud 23 depending from the boot A. The collar 21 is provided with a radial cam projection 24 which, as it engages the roller 20, throws the lever E from the position shown in Fig. 2, wherein the shears are open, into the position shown in Fig. 5, wherein the shears are closed; the shears being quickly reopened by the action of the spring 22 when the projection 24 passes beyond the roller 20. It is evident that the position of the cam 24 circumferentially of the shaft C determines the movement when the shears are closed, and the effective length of said cam, circumferential of the shaft, determines the period during which the shears remain closed. Thus by adjusting the collar 21 on the shaft, the closing of the shears may be properly timed, and the period of closing may be regulated by providing a plurality of collars with cams of various effective lengths, or the cam may be adjustable as to length in a manner similar to the cup swinging cam to be described.

It is thus evident that the shears are closed and then opened once during each revolution of the shaft C.

F is a cup or other suitable receptacle mounted on a lever G near the latter's inner end. Near its outer end said lever is secured to the lower end of a vertically disposed shaft 25, whose threaded end extends through a hole in said lever which latter is pivoted in its adjusted position relative to said shaft by means of upper and lower washers and nuts 26. Said shaft 25 extends up through a slide bearing 27 carried by the front plate 7, and the upper end of said shaft 25 is provided with a roller 28 journaled on a horizontal axis and held in engagement with the under side of a cam plate H mounted on the shaft C. A helical spring 29 connects the lever G with a pin on the bearing 27, thus tending to hold the lever G in and to automatically return said lever to its elevated position, and also maintaining the roller 28 in snug, resilient engagement with the cam plate H. The tension of said spring 29 is made adjustable. The plate H is provided on its lower surface with a partially circumferential cam face with a partially circumferential cam track 30, which when it engages the roller 28 depresses the lever G from its position shown in Fig. 1 to its level shown in Fig. 4. When the lever G is elevated, as shown in Fig. 1 the lip of the cup F is held in sealing contact with the metal ring 4 by the spring 29, with the interior of the cup F registering with the discharge orifice B.

When the lever G is depressed, as shown in Fig. 4, the cup F is dropped to provide clearance for the protrusion of the glass and to permit the shears to close to sever the gather. When depressed the cup is moved to one side out of the way of the depending glass.

For this purpose, I provide the outer end of the lever G with a relatively broad roller 31 which engages a collar 32 mounted on the shaft C. Said roller is held in snug and resilient contact with the perimeter of said collar by means of a helical spring 33 which connects the lever G with a post 34 depending from the boot A. The collar 32 is provided with a cam projection 35 which, when it engages the roller 31 swings the lever G from its position shown in Fig. 5 to that shown in Fig. 2, thus moving the cup from the side to a position directly under the orifice B, and when the cam passes the roller, the spring 33 automatically returns the cup to its inoperative position. The parts are so assembled that when the cup F is moved under the orifice B by the action of the cam 35, the movement of the cam plate H causes said cup to be raised into sealing registration with the said orifice, and before the rotation of the cam 35 causes the cup to be returned to its inoperative position, the cup is first lowered to clear the shears.

It is evident that the relative actions of the cam 35 and the cam plate H must be carefully adjusted, and timed with the operations of the shears. Therefore I have shown the cam 35 provided with extension plates 36 which are slotted so as to be clamped in any position relative to the permanent cam 35 by means of the screw bolts 37 extending through the slots into threaded holes in the cam 35. Thus the effective length of the cam and the positions of its ends may be adjusted.

Likewise the depending track 30 of the cam plate H should be adjustable as to its effective length, and the position of said plate on the shaft C should also be capable of adjustment. In my patent application, Serial Number 428,753, filed in the United States Patent Office, I show practical means for the adjustment of similar cam plates on the operating shaft of another form of feeder, and I may conveniently use the same in connection with the present invention.

When in its idle or inoperative position, I supply the cup G with a measured quantity of liquid which is gasified when the cup is applied to the discharge orifice B. Thus in Fig. 5 I have indicated a water supply tank I suitably supported adjacent to the feeder, and preferably of the constant level type. J represents a cylinder whose head is connected at one side with the tank I by means of an inlet pipe 38 whose cylinder end is provided with a ball valve 39, opening toward the cylinder, to prevent the escape of water from the cylinder J to the tank I. At its opposite side said cylinder is provided with a discharge pipe 40 whose outer end is down turned over the cup F when the latter is swung aside into its inoperative position. The cylinder end of the pipe 40 is provided with a ball valve 41 closing toward the cylinder J.

The head of the cylinder J is formed of a screw plate 42. 43 is a piston working in said cylinder, and 44 is a helical spring interposed between the cylinder head and the inner end of the piston, thus tending to force the latter outwardly. The stem of said piston is provided with a threaded bore in which is screwed the end of push rod 45 having an enlarged and rounded outer end or head. 46 is a lock nut screwed up on the push rod against the end of the piston stem and 47 is a plate attached to the end of the cylinder and adapted to be struck by the nut 46, thus limiting the outward movement of the piston.

48 is a striking finger pivoted on the cup F to swing on a vertical axis. 49 is a pin on said cup limiting the movement of the finger in one direction, and 50 is a helical spring connecting said finger and cup to normally maintain said finger in contact with said pin.

The outer end of said finger is provided with an enlarged and rounded head adapted to engage the head of the push rod 45 as the cup swings back into its inoperative position, said finger, under the influence of the spring 50, driving the piston 43 inwardly and thus closing the ball valve 39 and opening the ball valve 41 and forcing the liquid contents of the cylinder through the pipe 40 into the cup F. When the cup F is again moved under the discharge orifice, the spring 44 drives the piston 43 outwardly, closing the valve 41 and opening the valve 39, thus permitting the cylinder to be refilled from the tank I.

It is evident that the amount of liquid discharged into the cup by each inward movement of the piston 43 may be nicely regulated by adjusting the piston and lock nut on the push rod 45, thus determining the inward movement of the piston and, thereby, the amount of liquid discharged each time into the cup F.

It is of course apparent that the liquid may be supplied by an attendant, instead of automatically by mechanical means such as shown, but the latter is, of course, preferable in a modern factory.

I prefer to provide the bottom interior of the cup F with a lining or mat 51 of asbestos or other refractory, fibrous or cellular material which will take up a certain amount of the liquid so that there is no danger of the same being evaporated, before the cup is applied to the discharge orifice, to a degree sufficient to impair the effect of the gasification of the liquid.

The bottom of said cup is preferably recessed to hold the asbestos lining or mat in place.

In the operation of my feeder, the glass discharged through the orifice B is sheared off at intervals to form the gathers which drop down into the molds or other devices positioned to receive them. As the shears open, after the gather has been sheared and has dropped, the cup, containing the liquid charge, is moved under and then up into contact with the discharge orifice, the spring 29 holding the lip of the cup in sealing contact with the bottom face of the ring 4. Whereupon, the heat almost instantaneously gasifies the liquid, producing the necessary pressure to drive the sheared neck of the glass back along the orifice, thus temporarily interrupting the outward flow of glass to give opportunity for positioning a fresh mold under the orifice and also causing the sheared neck to be retracted into the zone of remelting heat which will eliminate the scar left by the shears or otherwise resulting from the detachment of the last gather. The amount of liquid supplied to the cup F is regulated, so that the pressure caused by gasification will be sufficient to force back the glass to the necessary degree to properly interrupt the flow of glass and eliminate the scar without blowing a hole in the body of the molten glass contained in the boot or causing air-streaks or bubbles in the same.

The cup is now depressed, thus relieving the pressure in the orifice, and moved aside out of the way to provide clearance for the glass which resumes its flow from the orifice. If, as is preferable, the cup is in substantially sealed contact with the orifice, the pressure is maintained, and in fact progressively increases, until the cup is lowered away from the orifice.

Although the successful feeding of glass may be accomplished without the use of means for controlling the passage of the glass through the discharge orifice, I find that in the presence of varying fluidity of the glass, more accurate results may be obtained by the use of a plunger valve or similar control for the inner end of the orifice. Thus I have shown a plunger valve K working in the boot A in relation to the orifice B. Said plunger is of refractory material and in the drawings, wherein the discharge orifice is in the bottom of the boot, the valve is shown as reciprocated in a vertical plane. The plunger is shown as cylindrical, to facilitate its expansion and contraction without cracking.

The roof of the boot is shown provided with a differential opening 51 for the insertion or removal of the plunger. Said opening is normally closed by the block 52 provided with an axial opening 53 for the metal stem 54 to the lower end of which the plunger K is attached.

The upper end of said stem is connected as by the clevis 55, with the lower end of a screw shaft 56 screwed through a nut 57 which is pivotally mounted, to swing on a horizontal axis, on the end of a walking beam L. The upper end of the shaft 56 is bent to form a crank handle, so that the plunger may be raised or lowered in relation to the walking beam, to enable it to properly close the orifice B, by turning the shaft 56 in the nut 57.

The plunger valve is actuated or reciprocated in a vertical plane by means of any suitable mechanism. Thus the following may be used.

The walking beam L extends through a vertically disposed slot in the bracket 9 and has its outer end forked to extend on either side of the bearing block 8 to which it is pivotally attached by means of a wrist bolt 58 extending through a pair of opposed holes 59 in the forks of the walking beam and a horizontally slotted hole 60 in the block 8. A plurality of pairs of opposed holes 59 are provided in the forks of the walking beam, so that the wrist bolt may be shifted from one pair of holes 59 to the other along the slot 60, to change the fulcrum point of the walking beam and thus adjust the throw of the plunger.

61 is a rod extending vertically through a hole in the walking beam L and held in rigid relation to the same, as by the upper and lower nuts 62 screwed on said rod against said walking beam. The upper end of said rod is guided in a hole in the bracket 9 while its lower end is bifurcated to receive the roller 63 which is journaled on a horizontal axis in said fork, and is in contact with the cam plate M. 64 is a helical spring coiled about the rod 61 between the walking beam and the bracket 8, acting to close said plunger valve.

To prevent the end of the plunger K hammering the bushing 2, as the former descends, which would quickly destroy the bushing and result, in particles of its material mixing with the glass, I prefer to provided a suitable, adjustable stop device which will limit the downward movement of the plunger. Thus 65 is a headed screw bolt screwed into a vertical hole in a projection 66 on the bracket 9. The head of the bolt 65 is in the path of the walking beam, so that by adjusting the bolt in its hole, the lowermost limit of movement for the plunger may be regulated. Thus the gradual wearing off of the lower end of the plunger may be compensated for, or plungers of different diameter may be arranged to properly coact with the tapering bore of the bushing 2 to interrupt the outward flow of glass through the discharge orifice.

The cam plate M is similar in principle to the cam plate H, above described, but has its cam track 67 on its upper, instead of its lower, face.

It is evident that as the shaft C revolves, the walking beam L is alternately raised and lowered, thus reciprocating the plunger K.

After the cup F has been removed from the lower end of the discharge orifice, thus relieving the pressure in the orifice, the glass resumes its flow through the latter to form the next gather. Just before the shears close to sever the gather, the plunger completes its downward movement and stops the flow of glass down through the orifice.

The shears now close, severing the gather which drops down, and the shears then open. The cup F is now brought into engagement with the lower end of the orifice, and as the plunger rises, the liquid contents of the cup are gasified, as already explained, thus forcing the chilled or scarred neck of glass up into the zone of remelting heat to eliminate the scar and temporarily suspend the outward flow of glass.

It is evident from the foregoing that my improved process and apparatus provide for the proper feeding of molten glass to fabricating mechanism in the form of gathers of any desired character or dimensions. The feed is accurate and positive, and may be regulated to produce any characters of gathers desired. The apparatus is simple and contains no parts likely to be impaired, easily broken or worn out.

Although, for the sake of clearness in description, I have minutely described the embodiment of the principles of my invention illustrated in the drawings, I do not wish to limit myself thereby, but claim broadly—

1. In the feeding of glass, the process of controlling the flow of molten glass through the discharge orifice between intermittent gather-detaching operations, which consists in closing the outer end of said orifice and applying to the outer end of said orifice a quantity of liquid which is gasified by the heat and causes the glass to be temporarily retracted along said orifice for the purposes described.

2. In the feeding of glass, the process of controlling the flow of molten glass through the discharge orifice between intermittent gather-detaching operations, which consists in applying to the outer end of said orifice a receptacle containing a quantity of liquid which latter is gasified by the heat and causes the glass to be temporarily retracted along said orifice for the purposes described.

3. In the feeding of glass, the process of controlling the flow of molten glass through the discharge orifice between intermittent gather-detaching operations, which consists in forcing the glass inwardly along said orifice by closing the outer end of said orifice and applying to the outer end of the latter a quantity of liquid which is gasified by the heat.

4. In the feeding of glass, the process of temporarily retracting the glass in the orifice for the purposes described, between intermittent gather-detaching operations, by the gasification of a quantity of liquid applied to the closed outer end of said orifice.

5. In the feeding of glass, for use in connection with a container for molten glass provided with a discharge orifice, the combination of means intermittently operative for detaching the glass protruding from said orifice to form gathers and means for closing the outer end of said orifice and applying thereto, between said detaching operations, a quantity of liquid which is gasified by the heat and causes the glass to be temporarily retracted along said orifice for the purposes described.

6. In the feeding of glass for use in connection with a container for molten glass provided with a discharge orifice, the combination of means intermittently operative for detaching the glass protruding from said orifice to form gathers, means for closing the outer end of said orifice and applying thereto between said detaching operations, a quantity of liquid which is gasified by the heat and causes the glass to be temporarily retracted along said orifice for the purposes described, and means for supplying liquid to said second named means.

7. In the feeding of glass, for use in connection with a container for molten glass provided with a discharge orifice, the combination of means intermittently operative for detaching the glass protruding from said orifice to form gathers, means for closing the outer end of said orifice and applying thereto, between said detaching operations, a quantity of liquid which is gasified by the heat and causes the glass to be temporarily retracted along said orifice for the purposes described, and means for supplying a measured quantity of liquid to said second named means.

8. In the feeding of glass, for use in connection with a container for molten glass provided with a discharge orifice, the combination of means intermittently operative for detaching the glass protruding from said orifice to form gathers, means for closing the outer end of said orifice and applying thereto, between said detaching operations, a quantity of liquid which is gasified by the heat and causes the glass to be temporarily retracted along said orifice for the purposes described, and means for supplying liquid to said second named means, said third named means being adjustable to regulate the quantity of liquid supplied.

9. In the feeding of glass, for use in connection with a container for molten glass provided with a discharge orifice, the combination of means intermittently operative for detaching the glass protruding from said orifice to form gathers, a receptacle adapted to contain a quantity of liquid, and means for applying said receptacle to the outer end of said orifice between detaching operations whereupon said liquid is gasified by the heat, causing the glass to be temporarily retracted along said orifice for the purposes described.

10. In the feeding of glass, for use in connection with a container for molten glass provided with a discharge orifice, the combination of means intermittently operative for detaching the glass protruding from said orifice to form gathers, a receptacle adapted to contain a quantity of liquid, means for applying said receptacle to the outer end of said orifice between detaching operations whereupon the liquid is gasified by the heat, causing the glass to be temporarily retracted along said orifice for the purposes described, and means for replenishing the supply of liquid to said receptacle when the latter is in its inoperative position.

11. In the feeding of glass, for use in connection with a container for molten glass provided with a discharge orifice, the combination of means intermittently operative for detaching the glass protruding from said orifice to form gathers, a receptacle adapted to contain a quantity of liquid, means for applying said receptacle to the outer end of said orifice between detaching operations whereupon the liquid is gasified by the heat, causing the glass to be temporarily retracted along said orifice for the purposes described, and means for replenishing the supply of liquid to said receptacle when the latter is in its inoperative position, said replenishing means being adjustable to regulate the quantity of liquid supplied to said receptacle.

12. In the feeding of glass, for use in connection with a container for molten glass provided with a discharge orifice, the combination of means intermittently operative for detaching the glass protruding from said orifice to form gathers, means for closing the outer end of the orifice and applying thereto, between intermittent detaching operations a quantity of liquid which is gasified by the heat and causes the glass to be temporarily retracted along said orifice for the purposes described, and means within said container for controlling the movement of the glass in said orifice.

13. In the feeding of glass, for use in connection with a container for molten glass provided with a discharge orifice, the combination of means intermittently operative for detaching the glass protruding from said orifice to form gathers, means for closing the outer end of the orifice and applying thereto, between intermittent detaching operations, a quantity of liquid which is gasified by the heat and causes the glass to be temporarily retracted along said orifice for the purposes described, and reciprocal means working within said container for controlling the movement of the glass in said orifice.

14. In the feeding of glass, for use in connection with a container for molten glass provided with a discharge orifice, the combination of means intermittently operative for detaching the glass protruding from said orifice to form gathers, means for closing the outer end of the orifice and applying thereto, between intermittent detaching operations, a quantity of liquid which is gasified by the heat and causes the glass to be temporarily retracted along said orifice for the purposes described, and a reciprocal plunger valve coacting with the inner end of said orifice to regulate the movement of glass in said orifice.

15. In the feeding of glass, for use in connection with a container for molten glass provided with a discharge orifice, the combination means intermittently operative for detaching the glass protruding from said orifice to form gathers, a receptacle adapted to contain a quantity of liquid, means for applying said receptacle to the outer end of said orifice between detaching operations whereupon said liquid is gasified, causing the glass to be temporarily retracted along said orifice for the purposes described, and means within said container for controlling the movement of the glass in said orifice.

16. In the feeding of glass, for use in connection with a container for molten glass provided with a discharge orifice, the combination of means intermittently operative for detaching the glass protruding from said orifice to form gathers, a receptacle adapted to contain a quantity of liquid, means for applying said receptacle to the outer end of said orifice between detaching operations whereupon said liquid is gasified, causing the glass to be temporarily retracted along said orifice for the purposes described, and reciprocal means within said container for controlling the movement of the glass in said orifice.

17. In the feeding of glass, for use in connection with a container for molten glass provided with a discharge orifice, the combination of means intermittently operative for detaching the glass protruding from said orifice to form gathers, a receptacle adapted to contain a quantity of liquid, means for applying said receptacle to the outer end of said orifice between detaching operations whereupon said liquid is gasified, causing the glass to be temporarily retracted along said orifice for the purposes described, and a reciprocal plunger valve coacting with the inner end of said orifice to control the movement of glass in the latter.

18. In the feeding of glass, for use in connection with a container for molten glass provided with a discharge orifice, the combination of means intermittently operative to detach the glass protruding from said orifice to form gathers, means for closing the outer end of said orifice and applying thereto, between said detaching operations, a quantity of liquid which is gasified by the heat and causes the glass to be temporarily retracted along said orifice for the purposes described, and means for regulating the relative operations of said first and said second named means.

19. In the feeding of glass, for use in connection with a container for molten glass provided with a discharge orifice, the combination of means intermittently operative for detaching the glass protruding from said orifice to form gathers, a receptacle adapted to contain a quantity of liquid and adapted to be applied to said orifice between detaching operations whereupon the liquid is gasified by the heat, causing the glass to be temporarily retracted along said orifice for the purposes described, and means for regulating the relative operations of said detaching means and said receptacle.

20. In the feeding of glass, for use in connection with a container for molten glass provided with a discharge orifice, the combination of means intermittently operative to detach the glass protruding from said orifice to form gathers, means for closing the outer end of said orifice and applying thereto, between detaching operations, a quantity of liquid which is gasified by the heat and causes the glass to be temporarily retracted along said orifice for the purposes described, a plunger valve working in relation to the inner end of said orifice, and means for regulating the relative operations of said first and second named means and of said plunger.

21. In the feeding of glass, for use in connection with a container for molten glass provided with a discharge orifice, the combination of means intermittently operative to detach the glass protruding from said orifice to form gathers, a receptacle adapted to contain a quantity of liquid and adapted to be applied to said orifice whereupon the liquid is gasified by the heat, causing the glass to be temporarily retracted along said orifice for the purposes described, a plunger valve working in relation to the inner end of said orifice, and means for regulating the relative operations of said detaching means, said receptacle and said plunger.

22. In the feeding of glass, for use in connection with a container for molten glass provided with a discharge orifice, the combination of means intermittently operative for detaching the glass protruding from said orifice to form gathers, a receptacle adapted to contain a quantity of liquid, means for applying said receptacle to the outer end of said orifice between detaching operations whereupon said liquid is gasified by the heat, causing the glass to be temporarily retracted along said orifice for the purposes described, and means for preventing the premature evaporation of said liquid.

23. In the feeding of glass, for use in connection with a container for molten glass provided with a discharge orifice, the combination of means intermittently operative for detaching the glass protruding from said orifice to form gathers, a receptacle adapted to contain a quantity of liquid, means for applying said receptacle to the outer end of said orifice between detaching operations whereupon said liquid is gasified by the heat, causing the glass to be temporarily retracted along said orifice for the purposes described, and an absorbent lining for said receptacle to prevent the premature evaporation of said liquid.

Signed at Pittsburgh, Pa., this 4th day of January 1921.

WILLIAM J. MILLER.